United States Patent [19]

Smith, deceased

[11] Patent Number: 5,045,658
[45] Date of Patent: Sep. 3, 1991

[54] MAGNETRON WITH TEMPERATURE PROBE ISOLATION

[75] Inventor: Peter H. Smith, deceased, late of Anchorage, Ky., by Pamela Sheila Smith, executor

[73] Assignee: General Electric Company, Louisville, Ky.

[21] Appl. No.: 138,714

[22] Filed: Dec. 28, 1987

[51] Int. Cl.$^5$ ............................................. H05B 6/68
[52] U.S. Cl. ..................... 219/10.55 B; 219/10.55 E; 219/516; 99/325; 374/149; 374/152
[58] Field of Search ................. 219/10.55 B, 10.55 E, 219/10.55 R, 516, 510; 99/325, 329 R, DIG. 14, 451; 374/149, 152, 155

[56] References Cited

U.S. PATENT DOCUMENTS

| | | | |
|---|---|---|---|
| 3,573,431 | 4/1971 | Tyler et al. | 219/516 |
| 4,081,645 | 3/1978 | Javes et al. | 219/10.55 B |
| 4,220,840 | 9/1980 | Barker | 219/10.55 B |
| 4,377,733 | 3/1983 | Yamaguchi et al. | 219/10.55 B |
| 4,600,827 | 7/1986 | Linwood et al. | 219/501 |
| 4,835,353 | 5/1989 | Smith et al. | 219/10.55 B |

Primary Examiner—Philip H. Leung
Attorney, Agent, or Firm—H. Neil Houser; Radford M. Reams

[57] ABSTRACT

An arrangement provides for the electrical grounding of a temperature probe and allows its use in conjunction with a cooking appliance control circuit having a floating signal ground. An isolation transformer connects the temperature probe to the control circuit. A temperature sensing circuit includes two parallel voltage-dividing legs. One of the legs includes a primary winding of the isolation transformer, whereas the other of the legs includes a variable resistor allowing a consumer to set the predetermined temperature at which the control circuit will stop heating. Preferably the control circuit is used to control a full wave full bridge inverter connected to an AC input line by way of a bridge rectifier. The inverter is connected to a magnetron by way of a power transformer. The voltage-dividing legs are connected to receive gate pulses from the control circuit, which gate pulses also are used for controlling switches within the inverter.

23 Claims, 5 Drawing Sheets

MAGNETRON WITH TEMPERATURE PROBE ISOLATION

CROSS-REFERENCE TO RELATED APPLICATIONS

This application discloses and claims subject matter related to subject matter disclosed and claimed in the following related applications, which applications are filed concurrently herewith and are hereby incorporated by reference:

"MAGNETRON WITH FULL WAVE BRIDGE INVERTER", Ser. No. 07/138,138;

"FILAMENT POWER COMPENSATION FOR COOKING MAGNETRON", Ser. No. 07/138,136 U.S. Pat. No. 4,835,353;

"MAGNETRON WITH FREQUENCY CONTROL FOR POWER REGULATION", Ser. No. 07/138,135, U.S. Pat. No. 4,843,202;

"MAGNETRON WITH MICROPROCESSOR POWER CONTROL", Ser. No. 07/138,137, Pat. No. 4,825,028; and "MAGNETRON WITH MICROPROCESSOR BASED FEEDBACK CONTROL", Ser. No. 07/138,139 U.S. Pat. No. 4,873,408.

These applications, which were filed in the name of Peter Smith except that "MAGNETRON WITH FREQUENCY CONTROL FOR POWER REGULATION" names Peter Smith and Flavian Reising, Jr. as co-investors, and "FILAMENT POWER COMPENSATION FOR COOKING MAGNETRON" names Peter Smith, Flavian Reising, Jr., and Thomas R. Payne as co-inventors, are assigned to the Assignee of the present application.

BACKGROUND OF THE INVENTION

This invention relates generally to a cooking magnetron power supply system and, more particularly, to such a system using a temperature probe.

Temperature probes have been used in connection with various cooking appliances. Such temperature probes often sense the internal temperature of a piece of meat or other item which is being cooked. Some of the temperature probes have been arranged to turn off or lower the cooking power of a cooking appliance upon the temperature reaching a predetermined point.

It is often desirable to have one side and the casing of a temperature probe placed at line ground for reasons of electrical safety.

Although various prior art arrangements for connecting temperature probes with cooking appliances have been generally useful, they have often been subject to one or more of several disadvantages. Some of the arrangements have not been readily compatible with the grounding of the temperature probe. Some prior art temperature probe connection arrangements have required complex circuitry beyond the circuitry needed to otherwise control the power supply. Additionally, some prior art temperature probe connection arrangements have required complex and/or expensive components in order to allow adjustment of the predetermined temperature upon which the power of the cooking appliance is removed and/or lowered.

Accordingly, it is a principle object of the invention to provide a new and improved temperature probe arrangement for use with a cooking appliance.

A more specific object of the present invention is to provide a temperature probe arrangement which provides isolation between a grounded temperature probe and the power supply of a cooking magnetron.

Other objects of the present invention include the providing of a temperature probe connection arrangement generally avoiding or minimizing the disadvantages common to numerous of the prior art temperature probe arrangements discussed above.

SUMMARY OF THE INVENTION

The present invention involves a temperature probe for a microwave cooking system driven by an inverter which receives power from an AC input line by way of a bridge rectifier. The inverter, which preferably is a full wave full bridge inverter, supplies power to a cooking element, preferably a cooking magnetron, which is controlled by a control circuit controlling the output power of the inverter. The temperature probe, which is grounded to the ground of the AC input line for safety purposes, has a variable impedance which varies with temperature changes. An important feature of the present invention is the provision of isolation means, preferably an isolation transformer, which connects the temperture probe to the control circuit, while maintaining electrical isolation between the temperature probe and the control circuit. A first winding of the isolation transformer is connected to the temperature probe, and a second winding of the isolation transformer is connected to the control circuit.

In more specific aspects of the present invention, the inverter is a full wave full bridge inverter having four switches controlled by gate pulses generated by the control circuit. The control circuit includes a temperature sensing circuit having a comparator and first and second parallel voltage-dividing legs, each leg having two impedances. A first input of the comparator is connected to a node in between two impedances of the first leg, one of these two impedances being a winding of the isolation transformer. The comparator has a second input connected to a reference point. The reference point is a node intermediate to the two impedances of the second leg. One of the impedances of the second leg may be changed by an operator in order to change the predetermined temperature at which the control circuit will turn off the inverter. The control circuit applies gate pulses to the first and second legs of the temperature sensing circuit.

BRIEF DESCRIPTION OF THE DRAWINGS

The above and other objects and features of the present invention will become more readily apparent when the following detailed description is considered in conjunction with the accompanying drawings wherein like characters represent like parts throughout the several views and in which.

DETAILED DESCRIPTION

Overview

Figure 1:
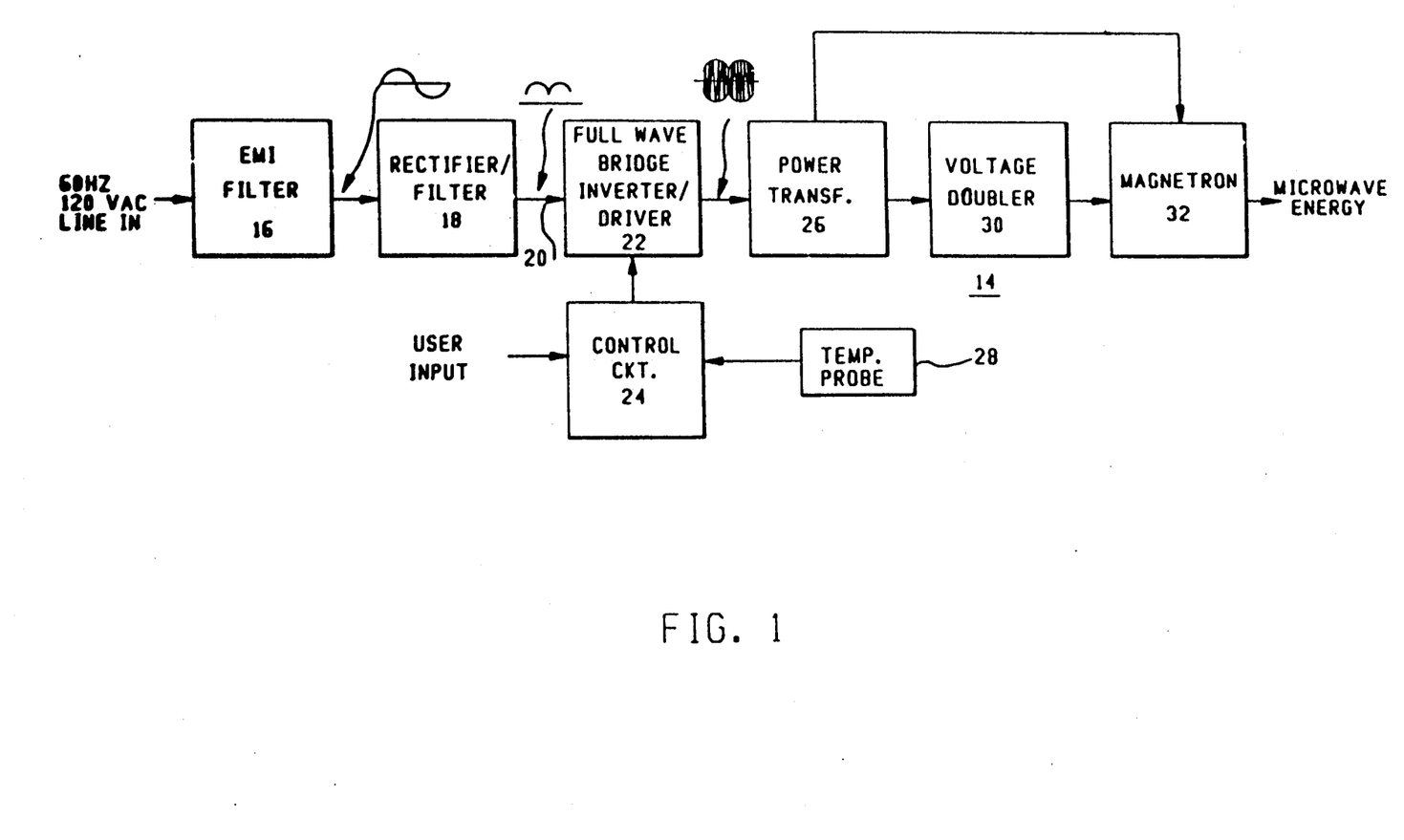
FIG. 1 shows a block diagram of the present system.

In the block diagram of FIG. 1, the microwave cooking system 14 of the present invention includes an electromagnetic interference (EMI) filter 16 connected to a standard AC line. The filter 16 prevents the system 14 from transmitting troublesome signals to the AC line. The EMI filter 16 is connected to a rectifier/filter 18. As shown, the output of the rectifier/filter 18 on line 20 is a bulk DC signal, meaning that it has a substantial ripple resulting from the 60 Hz coming into the system 14.

The bulk DC on line 20 is supplied to a full wave bridge inverter/driver 22. The inverter/driver 22, which is under the control of control circuit 24, supplies high voltage AC at a frequency of about 25 KHz to a power transformer 26. The control circuit 24 may receive user inputs with respect to power setting, temperature, time of operation and other conditions commonly set by users when operating a microwave oven. As shown, the control circuit 24 is connected to the power transformer 26. As will be discussed in more detail below, the control circuit 24 receives a feedback signal from the power transformer 26 for power control. The control circuit also receives temperature signals from temperature probe 28 when operation in a temperature control mode is selected by the user.

The power transformer 26 supplies energy to a voltage doubler 30 which in turn powers the magnetron 32. The magnetron 32 also receives current for its filament from the power transformer 26.

Inverter and Associated Circuitry

Figure 2:
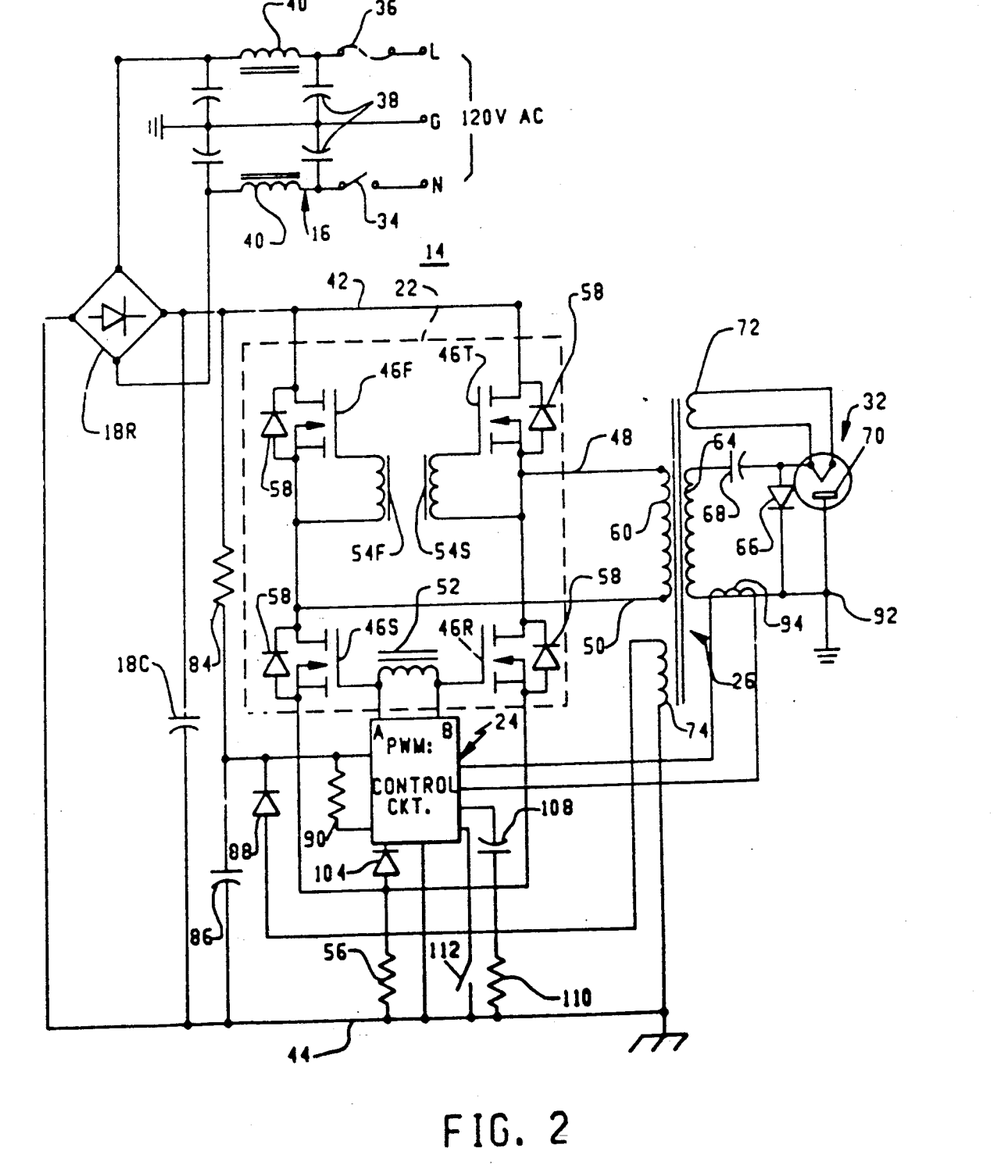
FIG. 2 shows a simplified schematic of the present system.

As shown in FIG. 2, the EMI filter 16 of the microwave generating system 14 receives 120 volts by way of power relay contacts 34 and fuse 36. The EMI filter 16 is a double pi filter comprising capacitors 38 and inductors 40. The signal from the filter 16 is supplied to the bridge rectifier 18R which supplies a rectified signal to lines 42 and 44. The signal is filtered by a filter capacitor 18C such that the signal across lines 42 and 44 is a bulk DC signal. Using a filter capacitor of 30 microfarads, 250 volt DC, the signal across lines 42 and 44 would vary in amplitude between 30 and 165 volts. Thus, the ripple or variation in amplitude resulting from the input AC signal is at least as great as the normal minimum voltage during operation of 30 volts. By operating the system 14 from bulk DC, one avoids the need for a high capacitance value capacitor for filter capacitor 18C. Use of a sufficiently high value capacitor as a filter would improve the smoothness of the DC signal across lines 42 and 44, but it would draw a very high current initially such that the fuse 36 and/or a circuit breaker in the user's household circuitry might be triggered.

The inverter/driver 22 includes first, second, third, and fourth transistors 46F, 46S, 46T, and 46R. The transistors serve as semiconductor switches for switching the bulk DC across inverter input lines 42 and 44 to the inverter output lines 48 and 50. The switches 46F, 46S, 46T, and 46R are switched on and off by control circuit 24. In the illustrative embodiment, the switches are 270 volt 18A power FETs which are commercially available from International Rectifier under the designation IRF 640.

The control circuit 24 is directly connected to the control terminals of semiconductor switches 46S and 46R. (For the MOSFETs shown, the control terminal will of course be the gate.) Additionally, the control circuit 24 controls the MOSFET switches 46F and 46T by way of an isolation transformer having a primary winding 52 and secondary windings 54F and 54S. The isolation transformer serves as an isolated drive circuit to allow the control terminals (more specifically gates) of switches 46F and 46T to float relative to the switches 46S and 46R. The isolation transformer, having primary 52 and secondary 54F and 54S, is a simple 1:1:1 pulse transformer. The drains of semiconductor switches 46F and 46T directly contact the inverter input line 42 and, therefore, may be considered as input terminals to those switches, whereas the source terminals of switches 46F and 46T may be considered as output terminals as they directly contact the respective inverter output lines 50 and 48. On the other hand, the sources of transistors 46S and 46R serve as input terminals in that they receive the input from inverter input line 44 by way of resistor 56, whereas the drains of switches 46S and 46R serve as output terminals in that they repectively connect to inverter output lines 50 and 48.

Each of the switches 46F, 46S, 46T, and 46R has a diode 58 connected in parallel with it. The diodes 58 prevent the transistor switches from burning out during the momentary deadband between turn off of one pair of switches and turn on of another pair of switches.

The inverter output lines 48 and 50 are connected to a primary winding 60 of a power transformer 26. The turns ratio between the primary 60 and a magnetron powering high voltage secondary winding 64 is established to provide a 2,000 volt square wave across the secondary winding when loaded to draw an average current of 540 mA. This voltage is half wave doubled by diode 66 and charge holding capacitor 68. The resulting negative going 4,000 volt square wave is applied to the cathode of the cooking magnetron 70. Typically, the power transformer 26 may have a primary winding 60 with 24 turns and a high voltage secondary winding 64 having 440 turns. Additionaly, a low voltage one turn secondary winding 72 provides the required 3 volts at 14 amps (RMS) for the filament of magnetron 70 and a 2 turn secondary winding 74 provides low voltage power to operate the control circuit 24.

Basic Inverter and Control Circuit Operation

Continuing to view FIG. 2, but also considering the waveform diagram of FIG. 3, the basic operation of the inverter 22 will be explained. The control circuit 24, which is discussed in detail below, may be used to provide different power levels to the magnetron 70. Parts (a)-(f) of FIG. 3 relate to a low power 20% operation, whereas parts (g)-(l) relate to a high power 100% operation of the magnetron.

Figure 3:
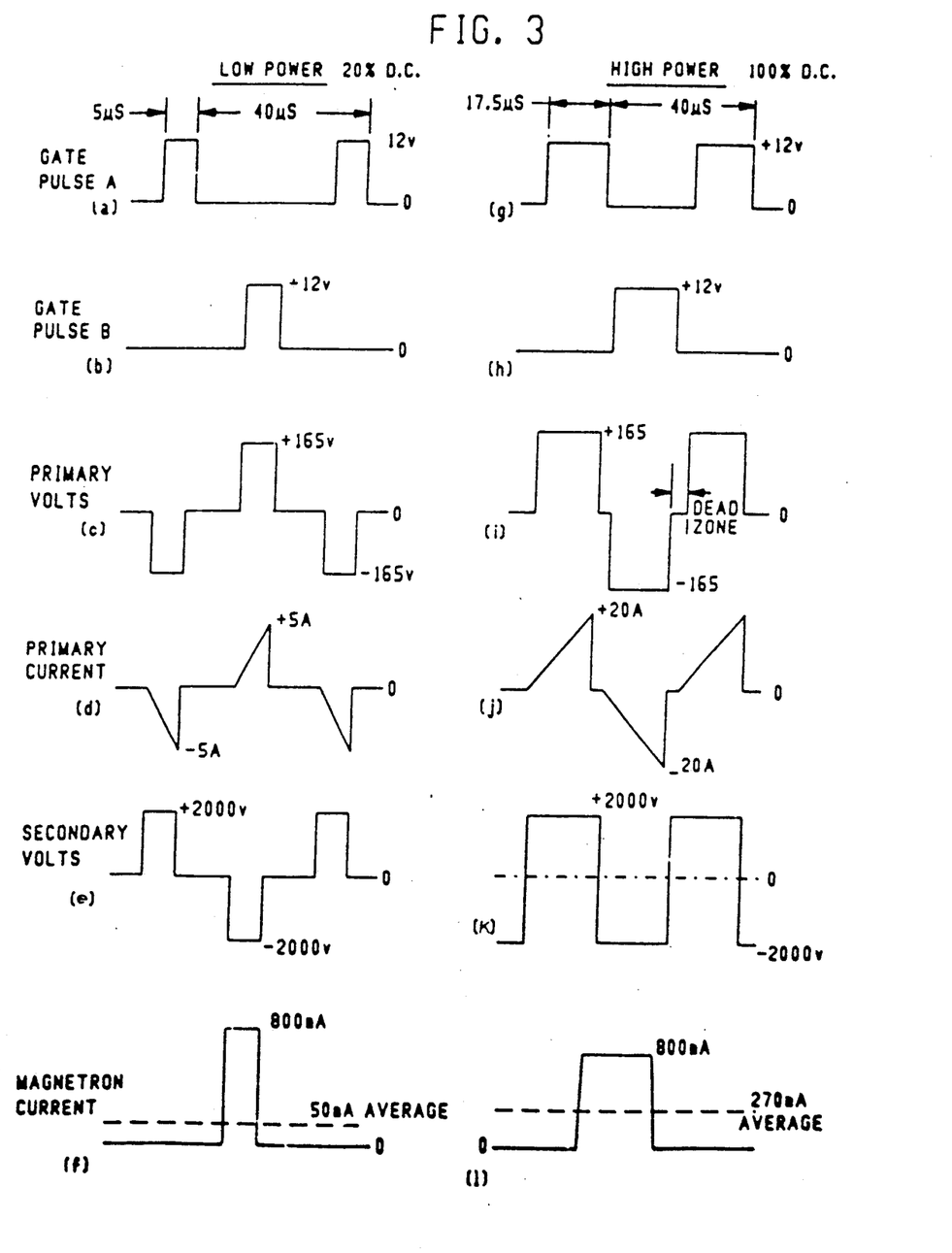
FIG. 3 is a time diagram of waveforms generated at different parts of the present system.

Taking first the low power operation, the control circuit 24 generates a gate pulse shown at part (a) of FIG. 3, which gate pulse appears at output A of control circuit 24 in FIG. 2. The gate pulse turns on or closes the transistor switch 46S and, by way of primary 52 and secondary 54S, closes the switch 46T. The control circuit 24 controls the power supplied to the magnetron 70 by controlling the width of the pulse. In part (a) of FIG. 3, the pulse is 5 microseconds wide. The frequency of the pulses is constant and the gate pulses A are generated repetitively during a series of first time intervals starting every 40 microseconds. Interspersed with the first time intervals, a series of gate pulses B (only one is shown in part (b) for ease of illustration) are generated at output B of control circuit 24. The gate pulse B closes the switches 46F and 46R. As shown in part (c) of FIG.

3, the alternate closing of pairs of the switches (46S and 46T together, and 46F and 46R together) applies the bulk D.C. (up to 165 volts peak) in alternate directions to the primary 60 of power transformer 26. The current in primary 60 is represented in part (d) of FIG. 3, whereas the voltage across secondary 64 is shown in part (e). The resulting magnetron current of approximately 800 mA is shown in part (f) of FIG. 3.

The operation of the circuitry as shown in parts (g)-(l) of FIG. 3 is essentially identical to that of parts (a)-(f) of FIG. 3 except that the gate pulses A and B are greater in time width in turn increases the width in all of the related waveform pulses. This corresponds to a greater time during which the current of 800 mA is applied to the magnetron as shown in part (1) of FIG. 3. Accordingly, an average of 270 mA is applied during high power operation, whereas the average is only 50 mA for low power operation.

It should be noted that, even in the high power operation of FIG. 3 parts (g)-(l), there should be a short dead zone or band between the end of one of the gate pulses at output A or output B and the beginning of the gate pulse at the alternate output. The existance of this "dead zone" is best illustrated in part I of FIG. 3, it being understood that this dead zone represents the delay from the end of gate pulse B to the beginning of gate pulse A. Typically, this delay might be 2.5 microseconds for a total dead zone of 5 microseconds considering also the corresponding delay between the end of gate pulse A and the beginning of gate pulse B.

CONTROL CIRCUIT DETAILS

Line regulation and output power control are provided by control circuit 24 which senses magnetron current and uses this current information in a closed loop feedback system to control the pulse width of the control signals applied to inverter 22. The control circuit 24 is a pulse width modulator, the connections of which are shown in detail in FIG. 4, which should be viewed in conjunction with FIG. 2. For ease of illustration, FIG. 2 does not include some components which are shown in the more detailed view of FIG. 4.

Figure 4:
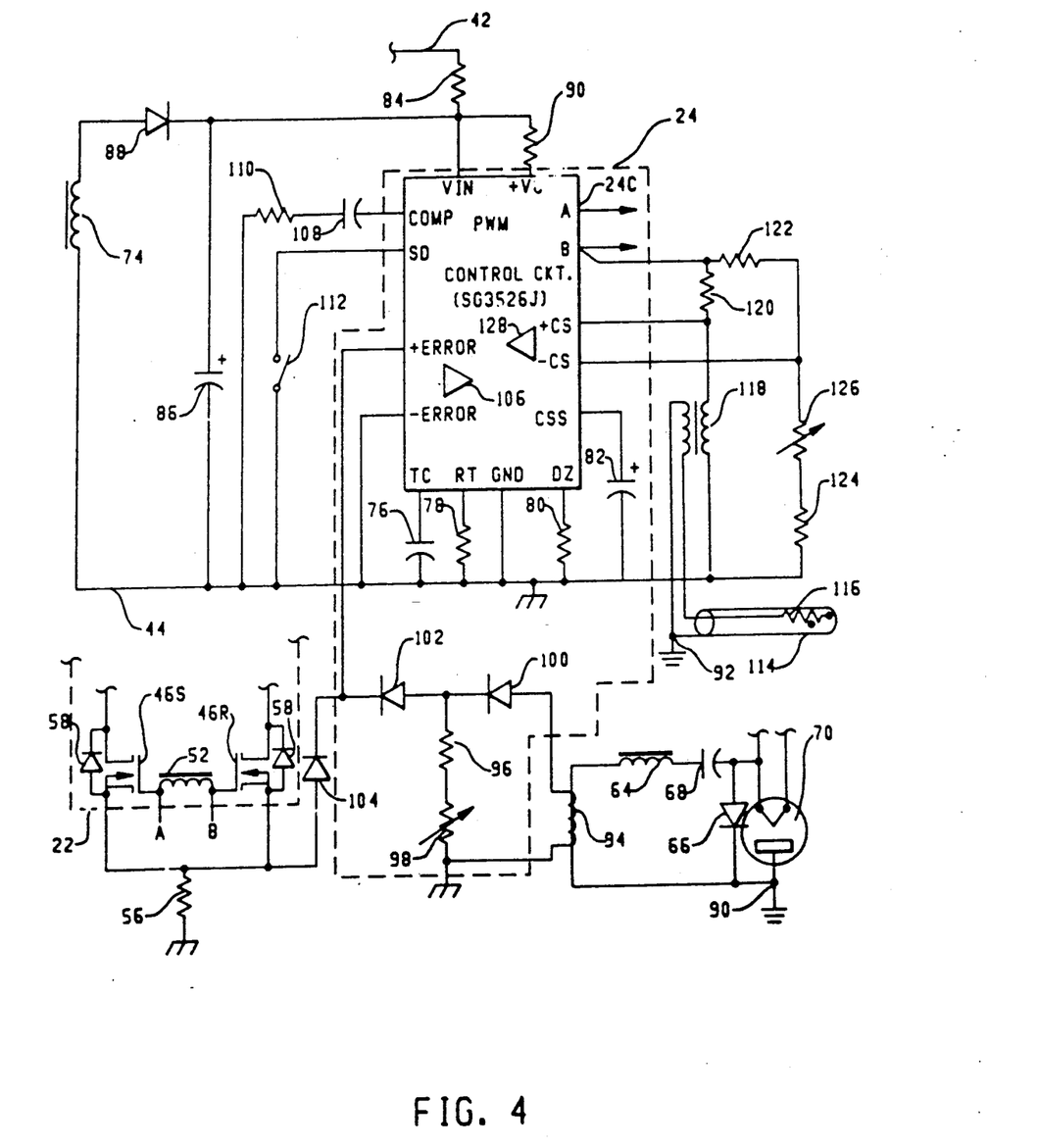
FIG. 4 shows details of a control circuit used with the present system.

The control circuit 24 includes a suitable drive generator chip 24C, such as the SG3526J, a pulse width modulator integrated circuit made by Silicon General. The pulse repetition rate, 20 KHz in the preferred embodiment, is established by using a timing capacitor 76 and a timing resistor 78 which respectively might have values such as 0.005 microfarads and 7.5K ohms. A resistor 80 which establishes the dead zone might have a value of, for example, 9 ohms. A slow start capacitor 82, which might have a typical value of 100 microfarads, is used to cause a linear time delay from start to reaching the operational pulse width.

When the control circuit 24 is in a stand-by condition (i.e., not generating gate pulses), the quiescent current is about 12 mA at a voltage of 15 volts. The quiescent current is supplied by a limiting resistor 84 connected to bulk DC rail 42 and smoothed to remove ripple from the AC line by smoothing capacitor 86. Improved regulation might be obtained by placing a 15 volt zener (not shown) in parallel with the capacitor 86. When generating gate pulses, the higher operating current for control circuit 24 is supplied by the low voltage winding 74 of the power transformer 26 (only winding 74 is shown in FIG. 4). This operating current is rectified by diode 88 and filtered by capacitor 86. A current limiting resistor 90, which might have a value of 33 ohms, is used to feed voltage to the common collectors of the control circuit chip 24C.

Line regulation and output power control is achieved by sensing magnetron current and using this signal to control the pulse width of the gate control signals generated by control circuit 24. Proportional control of the pulse width is implemented using an error amplifier 106 internal to control circuit chip 24C.

Toroid transformer 94 provides isolation and serves as a current transformer to sense the magnetron current. The primary winding of this transformer has 1 turn and the secondary of transformer 94 has 20 turns to provide a suitably transformed current. The transformed current generates a voltage across resistor 96 in series with variable resistor 98, which is rectified by diode 100 to provide a signal at the common node between resistors 96 and diode 100. This signal is proportional to the magnetron current for a given setting of the variable power control resistor 98. This proportional voltage signal is applied via diode 102 to the plus input of a transconductance amplifier 106 within the control chip 24C. The signal ground line 44 floats relative to the line ground 92 because of the forward conduction characteristics of the diodes within bridge rectifier 18R (18R shown in FIG. 2 only). Accordingly, isolation is required between the line grounded node of magnetron 70 and the signal ground or inverter input line 44.

The internal architecture of the pulse width modulation control circuit chip 24 provides an output pulse width proportional to the input error as determined by the error amplifier 106. During normal operation, the pulse width is determined by the voltage across the resistors 96 and 28, this voltage in turn being determined by the magnetron current. An example may be useful to best explain the feedback operation. If the circuit constants are established to provide full magnetron power output of 700 watts from a low line voltage of 110 volts with the pulse width modulator chip 24 producing pulse widths corresponding to 75% duty cycle, an increase in line voltage will in turn cause the magnetron current to increase such that the input error to the error amplifier 106 will be increased. This increase in the input error in turn reduces the pulse width and restores the magnetron current to the set point. For power control, user adjustment of the power adjustor variable resistor 98 changes the voltage across resistors 96 and 98 and, consequently, the plus input to the amplifier 106. This changes the pulse width of the control signal to inverter 22 which changes the power applied to the magnetron.

Amplifier 106 is also used to provide protection against excessive peak currents through switches 46F, 46R, 46S, and 46T. To this end, current sensing resistor 56 is used to sense the magnitude of the switching current. The voltage developed across resistor 56 is coupled to the plus input of error amplifier 106 via diode 104. Diode 104 and 102 are configured in logical OR fashion, to permit use of amplifier 106 for both magnetron current control and to limit switching current in inverter circuit 22.

The transconductance or error amplifier 106 has its gain and phase control established by an external frequency compensation network comprising capacitor 108 and resistor 110. As an example, using a capacitor 108 of 100 pF and a resistor 110 of five kilo ohms, compensation is made for unity-gain stability by placing a pole at 400 Hz.

Start and stop operation of the pulse width modulator control circuit chip 24 is achieved by control of the relay contact 112 which connects and disconnects a shutdown ("SD") input with respect to the signal ground line 44.

PROBE ISOLATION

It will be recalled that a principle object of the invention is to provide an improved temperature probe arrangement which provides electrical isolation between the grounded temperature probe and the power supply for the magnetron.

As shown in FIG. 4, a temperature probe 114 is used with control circuit 24. Probe 114 is to be inserted by the user into a food load being heated to sense the temperatue of the food. The impedance of probe 114 varies with the temperature of the food into which it is inserted. The control circuit 24 uses the temperature information derived from the probe to change the output power of the magnetron when the impedance reaches a value corresponding to a predetermined temperature established by user selection of the set point temperature.

In the illustrative embodiment, the temperature probe 114 includes a temperature dependent resistive element 116, one side of which is connected to the line ground 92. As shown, the housing of probe 114 is likewise grounded. Accordingly, electrical isolation is necessary between the temperature probe 114 and the floating signal ground 44 of the control circuit chip 24C. Isolation means in the form of a toroid transformer 118 is used to provide the necessary isolation between the temperature probe 114 and the rest of control circuit 24. A BNC or other connector (not shown) may be used to attach and detach the connection between probe 114 and transformer 118. The temperature probe 114 may be driven by the gate pulses output at B of chip 24C. This pulse is applied to the primary of transformer 118 by way of resistor 120. Additionally, this output pulse feeds a temperature setpoint resistor network having resistors 122 and 124 and variable resistor 126. The common node between resistor 120 and primary of transformer 118 is used as the positive input to a comparator 128. This built-in comparator 128 causes both A and B output gate pulses to disappear upon its activation, thus shutting down the inverter. As temperature increases, the resistance of element 116 decreases which causes more current to flow through the primary of isolation transformer 118. This change in current is sensed as a changing voltage across the sensing resistor 120. When equal to the setpoint determined by the voltage provided by resistors 122, 124, and 126, this temperature dependent voltage disables the comparator 128 and causes the inverter to go into a shutdown mode. Accordingly, when the temperature as sensed by element 116 reaches the predetermined temperature which is established by setting the variable resistor 126, the microwave power is turned off.

It will be appreciated that the control circuit 24 includes a temperature sensing circuit comprised of the comparator 128 together with resistors 120, 122, 124, variable resistor 126, and the primary of isolation transformer 118. In particular, the resistor 120 and primary of transformer 118 constitute a first leg which is connected to the first input (+CS) of the comparator 128. That input will therefore vary with variations in the resistance of element 116. The comparator 128 compares the signal provided at the +CS input with a reference voltage provided by the leg of the circuit comprising resistors 122, 124, and variable resistor 126. The setpoint temperature for the probe, represented by this reference voltage may be changed by user adjustment of the variable resistor 126.

Figure 5:
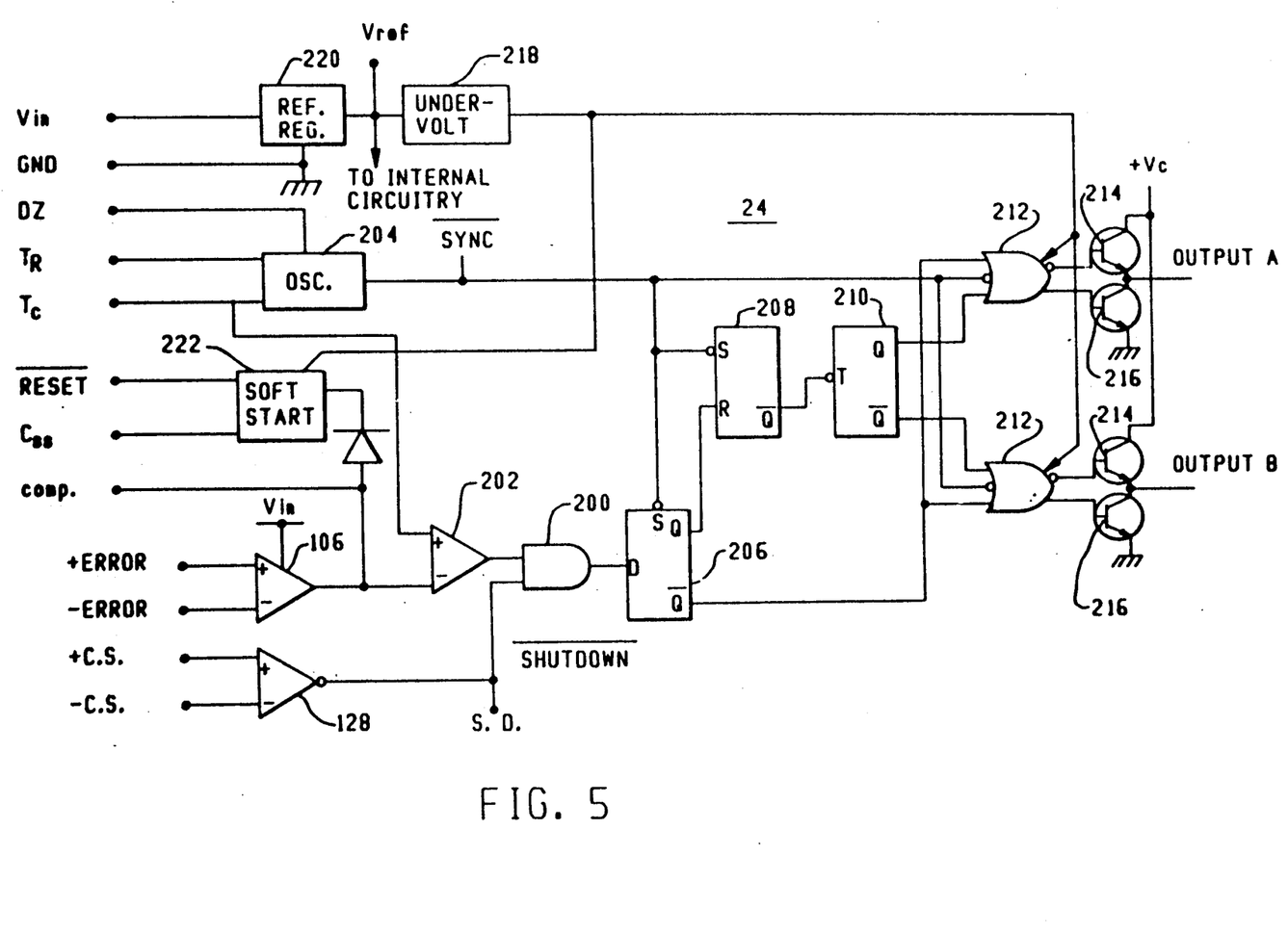
FIG. 5 shows a schematic of an integrated circuit chip which is used as part of the control circuit of the present invention.

FIG. 5 is a block diagram of the parts within the control circuit chip 24C. As this block diagram is from the specifications provided by Silicon General for its SG3526J chip, the inner workings of this chip will be discussed only very briefly.

Although other arrangements could be used to turn off the inverter, the use of comparator 128 which is part of the pulse width modulation control chip 24C is quite advantageous. The comparator 128 is provided in the chip as a current limit comparator in order to provide very fast response to overcurrent conditions. The comparator has a fixed input offset of 100 mV plus a slight hysterisis of 20 mV to eliminate indecision at the threshold point. Referring back momentarily to FIG. 4, these characteristics allow the current sensing circuit realized by comparator 128 and the voltage-dividing impedance legs at its inputs to rapidly sense when the temperature of food detected by probe 114 has reached a predetermined temperature level as set by variable resistor 126. Upon the temperature reaching the predetermined temperature set point, the output of comparator 128 goes low, thereby shutting off the flow of pulses through AND gate 200. The upper input to AND gate 200 receives the output of a comparator 202 which compares a ramp output by oscillator 204 with a signal provided by the amplifier 106. Accordingly, the output of comparator 202 is a series of pulses having widths which vary with the input to amplifier 106. Unless a shut-down signal appears at the lower input of gate 200, the output of the gate 200 will be a pulse width modulated signal which is applied to a metering flip-flop 206. The metering flip-flop 206 allows only one output per oscillator cycle and is connected to a memory flip-flop 208. The memory flip-flop 208 prevents double pulses from a single output driver. The memory flip-flop 208 is in turn connected to a toggle flip-flop 210. The toggle flip-flop 210 alternately generates output pulses at outputs A and B by way of gates 212 and the output driver stages including transistors 214 and 216.

The generation of the shut-down signal by operation of the comparator 128 blocks the output of comparator 202 from being received at flip-flop 206. In turn this stops the generation of the gating pulses at outputs A and B and therefore turns off the inverter (not shown in FIG. 5). Therefore, the inverter will be shut down when the food reaches the predetermined temperature as set by variable resistor 126 (FIG. 4 only).

As shown in FIG. 5, the chip 24 includes an undervoltage lockout circuit 218, reference regulator 220, and soft-start circuit 222. The reference regulator 220 provides a reference voltage, whereas the undervoltage lockout 218 prevents the occurrence of output pulses at outputs A and B when undervoltage conditions are occurring. The soft-start circuit 222 cooperates with the capacitor 82 (FIG. 4) to provide a gradual increase in pulse width when the control circuit 24C is started.

Although various specific circuit values, constructions, and other details have been disclosed herein, it is to be appreciated that these are for illustrative purposes only. Various modifications and adaptations will be readily apparent to those of skill in the art. Accordingly, it is understood that the appended claims are intended to cover all such modifications and changes as fall within the true spirit and scope of the invention.

What is claimed is:

1. A cooking system comprising:
   an AC power source receiving power from an AC input line;
   a cooking element for heating food, said cooking element operatively connected to receive power from said AC power source;
   a control circuit having a floating signal ground, said control circuit connected to said AC power source and operable to control the power of said AC power source;
   a temperature probe for sensing the temperature of the food being heated, said probe having an impedance which varies with changes in temperature, said temperature probe being grounded to a ground of the AC input line; and an isolation transformer having a primary winding connected to said control circuit and a secondary winding connected to said temperature probe; and
   wherein said control circuit is operable to change the power of the AC power source upon said variable impedance reaching a value corresponding to a predetermined temperature of food being subjected to said cooking element.

2. The cooking system of claim 1 wherein said cooking element is a cooking magnetron.

3. The cooking system of claim 2 wherein said AC power source is a full wave full bridge inverter having four switches controlled by gate pulses generated by said control circuit.

4. The cooking system of claim 3 wherein said control circuit includes a comparator, and a first leg having two impedances for driving a voltage and a first node in between said two impedances of said first leg, said comparator having a first input connected to said first node and a second input connected to a reference point, and wherein one of said two impedances of said first leg is said primary winding of said isolation transformer.

5. The cooking system of claim 4 wherein said control circuit applies gate pulses to said first leg.

6. The cooking system of claim 5 wherein said control circuit further includes a second leg having two impedances for driving a voltage, and wherein said reference point is a node intermediate to said two impedances of said second leg.

7. The cooking system of claim 6 wherein one of the impedances of said second leg is variable by operator setting to change said predetermined temperature.

8. The cooking system of claim 3 wherein said control circuit is operable to turn off the inverter upon said predetermined temperature being reached.

9. A cooking system comprising:
   a full wave full bridge inverter receiving power from an AC input line;
   a cooking magnetron connected to receive power from said inverter;
   a control circuit operable to control the flow of power from said inverter to said cooking magnetron;
   a temperature probe being grounded to a ground of the AC input line, said temperature probe having an impedance which varies with temperature of a food into which the temperature probe is inserted; and
   isolation means connecting said temperature probe to said control circuit and maintaining electrical isolation between said temperature probe and said control circuit; and
   wherein said control circuit is operable to change the output power of said cooking magnetron upon said impedance reaching a value corresponding to a predetermined temperature of food being subjected to said cooking magnetron.

10. The cooking system of claim 9 wherein said control circuit includes a comparator, and a first leg having two impedances for dividing a voltage and a first node in between said two impedances of said first leg, said comparator having a first input connected to said first node and a second input connected to a reference point, and wherein one of said two impedances of said first leg is a part of said isolation means.

11. The cooking system of claim 10 wherein said control circuit applies gate pulses to said first leg.

12. The cooking system of claim 10 wherein said control circuit further includes a second leg having two impedances for dividing a voltage, and wherein said reference point is a node intermediate to said two impedances of said second leg.

13. The cooking system of claim 12 wherein one of the impedances of said second leg is variable by operator setting to change said predetermined temperature.

14. The cooking system of claim 10 wherein said isolation means is an isolation transformer.

15. A cooking system comprising:
   an inverter receiving power from an AC input line, said inverter having a plurality of switches;
   a cooking magnetron connected to receive power from said inverter;
   a control circuit operable to control the flow of power from said inverter to said cooking magnetron, said control circuit generating gate pulses which control the state of said switches, said control circuit including a temperature sensing circuit receiving said gate pulses;
   a temperature probe being grounded to a ground of the AC input line, said temperature probe having an impedance which varies with temperature of a food into which the temperature probe is inserted; and
   isolation means connecting said temperature probe to said temperature sensing circuit of said control circuit and maintaining electrical isolation between said temperature probe and said control circuit; and
   wherein said control circuit is operable to change the power of said cooking magnetron upon said impedance reaching a value corresponding to a predetermined temperature of food being subjected to said cooking magnetron.

16. The cooking system of claim 15 wherein said temperature sensing circuit includes a comparator, and a first leg having two impedances for dividing a voltage and a first node in between said two impedances of said first leg, said comparator having a first input connected to said first node and a second input connected to a reference point, and wherein one of said two impedances of said first leg is a part of said isolation means.

17. The cooking system of claim 16 wherein said temperature sensing circuit further includes a second leg having two impedances for dividing a voltage, and wherein said reference point is a node intermediate to said two impedances of said second leg.

18. The cooking system of claim 17 wherein one of the impedances of said second leg is variable by operator setting to change said predetermined temperature.

19. The cooking system of claim 18 wherein said control circuit is operable to turn off the inverter upon said predetermined temperature being reached.

20. The cooking system of claim 19 wherein said first and second legs are connected in parallel.

21. The cooking system of claim 20 wherein said control circuit applies gate pulses to said first and second legs.

22. The cooking system of claim 16 wherein said inverter is full wave full bridge inverter and said control circuit has a floating ground.

23. The cooking system of claim 22 wherein said isolation means is an isolation transformer.

* * * * *

UNITED STATES PATENT AND TRADEMARK OFFICE
CERTIFICATE OF CORRECTION

PATENT NO. : 5,045,658
DATED : 9/3/91
INVENTOR(S) : Peter Harold Smith

It is certified that error appears in the above-identified patent and that said Letters Patent is hereby corrected as shown below:

Column 9, Line 35, "driving" should read --dividing--.

Signed and Sealed this

Nineteenth Day of January, 1993

Attest:

DOUGLAS B. COMER

*Attesting Officer*     Acting Commissioner of Patents and Trademarks